US007675974B2

(12) United States Patent
Kawashima (10) Patent No.: US 7,675,974 B2
(45) Date of Patent: Mar. 9, 2010

(54) VIDEO ENCODER AND PORTABLE RADIO TERMINAL DEVICE USING THE VIDEO ENCODER

(75) Inventor: Yuji Kawashima, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1384 days.

(21) Appl. No.: 11/089,649

(22) Filed: Mar. 25, 2005

(65) Prior Publication Data

US 2006/0215758 A1    Sep. 28, 2006

(30) Foreign Application Priority Data

Mar. 23, 2005    (JP)    ............... 2005-084776

(51) Int. Cl.
H04N 7/12        (2006.01)
H04N 11/02      (2006.01)

(52) U.S. Cl. ............................... 375/240.16
(58) Field of Classification Search ........... 375/240.16, 375/240.24, 240.18
See application file for complete search history.

(56) References Cited

U.S. PATENT DOCUMENTS

| 5,825,930 | A  | * | 10/1998 | Park et al. ............ 382/236 |
| 6,438,254 | B1 | * | 8/2002  | Kadono et al. ........ 382/107 |
| 2004/0028282 | A1 | * | 2/2004  | Kato et al. ............. 382/236 |
| 2004/0264572 | A1 | * | 12/2004 | Sato et al. ............. 375/240.16 |
| 2005/0105620 | A1 | * | 5/2005  | Fukushima ............ 375/240.16 |
| 2005/0226335 | A1 | * | 10/2005 | Lee et al. .............. 375/240.16 |

FOREIGN PATENT DOCUMENTS

| JP | 08-140101 A | 5/1996 |
| JP | 09-271028 A | 10/1997 |
| JP | 2003-284091 A | 10/2003 |

OTHER PUBLICATIONS

Article entitled Overview of the H.264/AVC Video Coding Standard, pp. 560-576, Thomas Wiegand, published in the IEEE Transactions on Circuits and Systems for Video Technology, vol. 13, No. 7, Jul. 2003.

(Continued)

Primary Examiner—Tung Vo
Assistant Examiner—Anner Holder
(74) Attorney, Agent, or Firm—Frishauf, Holtz, Goodman & Chick, P.C.

(57) ABSTRACT

A motion compensation predictor comprises a reference picture selection unit, a center-of-search-setting unit, a search-range-setting unit, a motion vector search unit and a motion compensation unit. The motion compensation unit repeatedly performs, for a target block in a motion picture signal, selection of a reference picture signal, setting of the center of search, setting of a search range, and a search for a motion vector, thereby acquiring an optimal motion vector. The unit then performs motion compensation on reference picture signals sequentially selected, using the optimal motion vector, to generate a predicted picture signal. The motion-vector-search unit sets the search range on a reference picture indicated by a currently selected reference picture signal, based on information related to a motion vector detected in the search range set on a reference picture indicated by a preceding reference picture signal.

8 Claims, 7 Drawing Sheets

OTHER PUBLICATIONS

Article entitled Rate-Constrained Coder Control and Comparison of Video Coding Standards, pp. 688-703, Thomas Wiegand, published in the IEEE Transactions on Circuits and Systems for Video Technology, vol. 13, No. 7, Jul. 2003.

Article entitled Rate Distortion Optimized Video Coding with Stopping Rules: Quality and Complexity, pp. 753-756, Marcos Moecke, Linse—Circuits and Signal Processing Laboratory Depart of Electrical Engineering Federal Univerisity of Santa Catarina 88040-900—Florianopolis -SC, Brazil, published IEEE 2004.

* cited by examiner

VIDEO ENCODER AND PORTABLE RADIO TERMINAL DEVICE USING THE VIDEO ENCODER

CROSS-REFERENCE TO RELATED APPLICATIONS

This application is based upon and claims the benefit of priority from prior Japanese Patent Application No. 2005-084776, filed Mar. 23, 2005, the entire contents of which are incorporated herein by reference.

BACKGROUND OF THE INVENTION

1. Field of the Invention

The present invention relates to a video encoder and a portable radio terminal device using the video encoder.

2. Description of the Related Art

In the MPEG scheme as a typical compression/encoding technique for motion pictures, encoding as a combination of motion compensation prediction (inter prediction), intra prediction, discrete cosine transform (DCT) and variable-length encoding is performed.

On the other hand, IEEE TRANSACTION ON CIRCUIT AND SYSTEMS FOR VIDEO TECHNOLOGY, VOL. 13, No. 7, 2003, "Overview of the H.264/AVC Video Coding Standard", Thomas Wiegand. for ITU-T Rec.H.264 ISO/IEC 14496-10 AVC discloses another motion-picture encoding scheme, called H.264/AVC, which improved encoding efficiency more than the MPEG scheme. In H.264/AVC, in motion compensation prediction, a motion vector is searched for using a plurality of reference pictures, and motion compensation is performed using an optimal motion vector acquired by the search. Thomas Wiegand, Heiko Schwarz, Anthony Joch, Faouzi Kossentini, Senior Member, IEEE, and Gary K. Sullivan, Senior Member IEEE, "Rate-Constrained Coder Control and Comparison of Video Coding Standards" IEEE TRANSACTIONS AND SYSTEMS FOR VIDEO TECHNOLOGY, VOL. 13, NO. 7, JULY 2003 discloses rate-distortion optimization (RDO) as a coding mode selection method for selecting a coding mode that employs an optimal combination of a coding distortion rate and the number of coded bits.

In H.264/AVC, since an optimal motion vector can be determined from a plurality of reference pictures, a high coding efficiency is realized. However, the number of times of block matching for searching for an optimal motion vector is increased in proportion to the number of reference pictures. When the number of times of block matching is increased, the number of calculations necessary for motion compensation prediction is increased. Therefore, when a conventional video encoder is installed, in particular, in a device of low CPU power, such as a portable radio terminal device, it disadvantageously imparts a significant load to the CPU.

BRIEF SUMMARY OF THE INVENTION

It is an object of the invention to provide a video encoder suitable for H.264/AVC and capable of motion compensation prediction with a small number of calculations, and a portable radio terminal device using the video encoder.

In accordance with one aspect of the invention, there is provided a vide encoder for encoding a motion picture signal, comprises a reference picture selection unit; a center-of-search-setting unit; a search-range-setting unit; a motion vector search unit and a motion compensation unit. The motion compensation unit repeatedly performs, for a target block in a motion picture signal, selection of a reference picture signal, setting of the center of search, setting of a search range, and a search for a motion vector, thereby acquiring an optimal motion vector. The unit then performs motion compensation on reference picture signals sequentially selected, using the optimal motion vector, to generate a predicted picture signal. The motion-vector-search unit sets the search range on a reference picture indicated by a currently selected reference picture signal, based on information related to a motion vector detected in the search range set on a reference picture indicated by a preceding reference picture signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the invention will be described with reference to the accompanying drawings.

Figure 1:
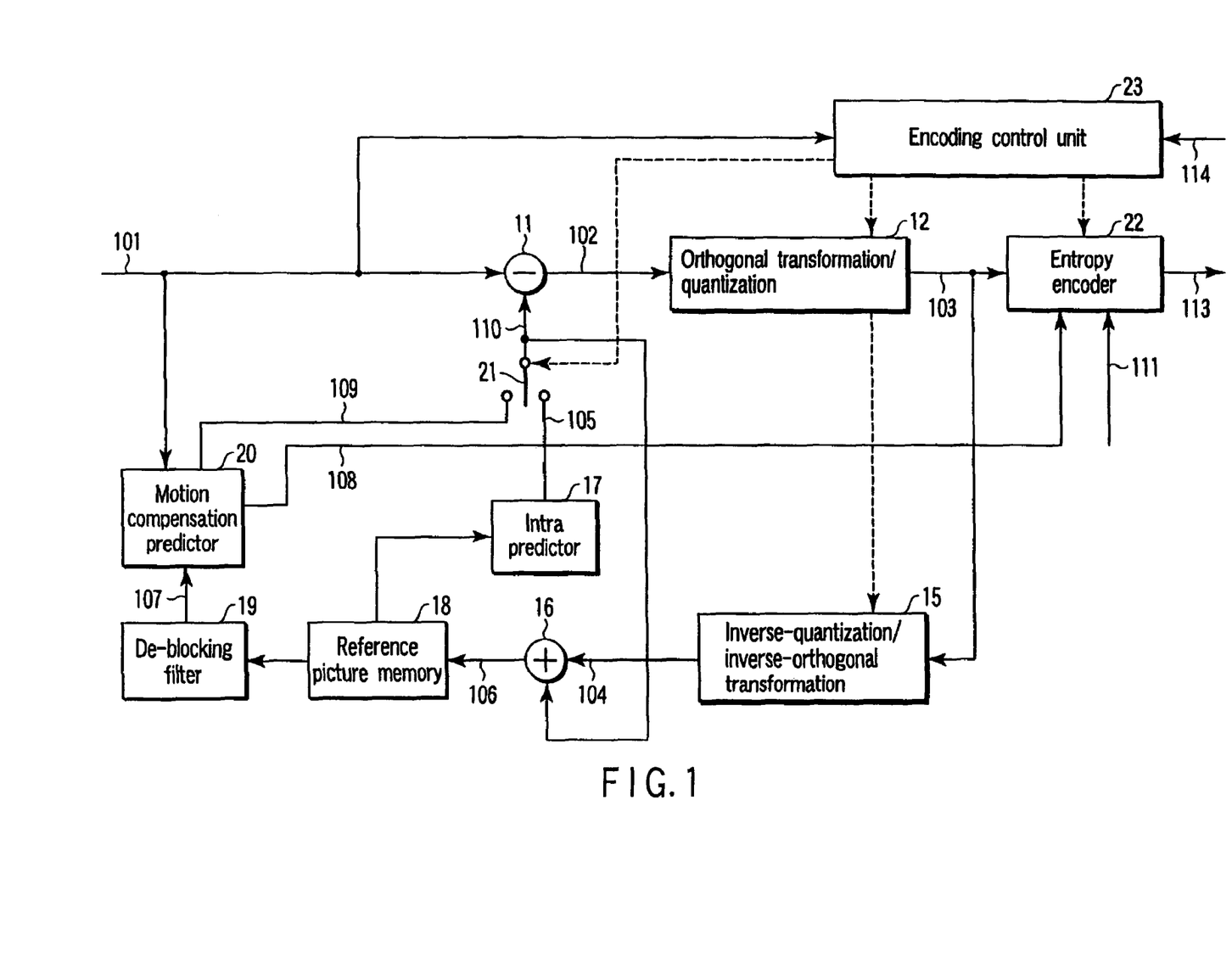
FIG. 1 is a block diagram illustrating a video encoder according to an embodiment of the invention.

FIG. 1 shows a video encoding apparatus according to a first embodiment. In the embodiment, a motion picture signal 101 is input to the video encoding apparatus in units of, for example, frames. Specifically, the motion picture signal 101 is input to a subtractor 11, which, in turn, generates a predictive residual signal 102 that is the difference between the motion picture signal 101 and a prediction signal 110. The predictive residual signal 102 is sent to an orthogonal transformation/quantization unit 12, where it is subjected to orthogonal transformation and quantization. As a result, quantized orthogonal transformation coefficient information 103 is generated. The quantized orthogonal transformation-coefficient information 103 is input to an entropy encoder 22 and an inverse-quantization/inverse-orthogonal transformation unit 15.

The quantized orthogonal transformation-coefficient information 103 is processed by the inverse-quantization/inverse-orthogonal transformation unit 15, whereby a signal 104 similar to the predictive residual signal 102 is generated.

The inverse-quantization/inverse-orthogonal transformation unit 15 performs inverse-quantization/inverse-orthogonal transformation that is an inverse process to the process of the orthogonal transformation/quantization unit 12. The signal 104 output from is sent to an adder 16, where it is added to an intra prediction signal 110 that is sent from a mode selection switch 21. As a result, a local decoding picture signal 106 is generated. The local decoding picture signal 106 is stored as a reference picture signal in a reference picture memory 18. A plurality of reference picture signals are sequentially stored into the reference picture memory 18.

Each reference picture signal read from the reference picture memory 18 is filtered by a de-blocking filter 19. A reference picture signal 107 acquired after filtering is input to a motion compensation predictor 20. The motion compensation predictor 20 detects a motion vector in the filtered reference picture signal of a plurality of frames, and performs motion compensation using the motion vector, thereby generating motion vector information 108 and a motion compensation prediction signal 109. The motion compensation predictor 20 will be described later in detail.

The mode selection switch 21 selects the intra prediction signal 105 when an intra prediction mode is set, and selects the motion compensation prediction signal 109 when a motion compensated prediction mode (inter prediction mode) is set according to a coding mode information output from a coding controller 113. The prediction signal 110 selected by the mode selection switch 21 is input to the subtractor 11.

The entropy encoder 22 performs entropy encoding, such as arithmetic encoding, on the quantized orthogonal transformation-coefficient information 103 output from the orthogonal transformation/quantization unit 12, and on the motion vector information 108 and prediction mode information 111 output from the motion compensation predictor 20, thereby generating respective variable length codes corresponding to the information items 103, 108 and 111. Each variable length code 113 is supplied as syntax data to a multiplexing unit (not shown) located after the encoder 22, where it is converted into a coded bit stream by multiplexing. The coded bit stream is smoothed by an output buffer (not shown) and then sent to a transmission or storage system (not shown).

The coding controller 113 monitors, for example, the activity of the motion picture signal 101 and the buffer amount of the output buffer, and controls quantization parameters, used in the orthogonal transformation/quantization unit 12 and inverse-quantization/inverse-orthogonal transformation unit 15, the entropy encoder 22 and the mode selection switch 21, to make the buffer amount constant.

Figure 2:
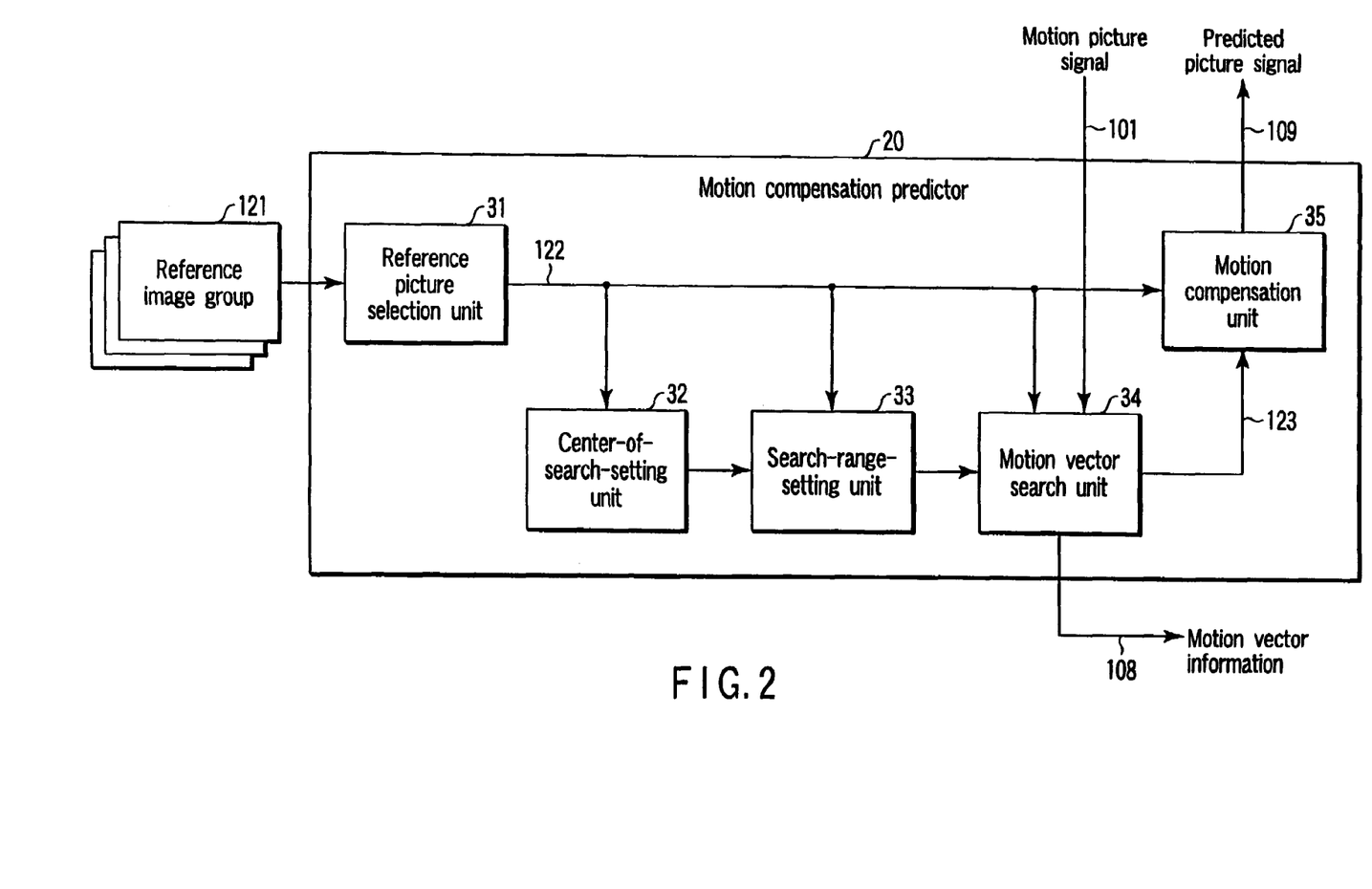
FIG. 2 is a block diagram illustrating functional units incorporated in the motion compensation predictor appearing in FIG. 1.

As shown in FIG. 2, the motion-compensation predictor 20 receives a reference picture set 121 that is in the form of the reference picture signal 107 acquired after filtering by the de-blocking filter 19, and selects a reference picture 122 using a reference picture selecting unit 31 incorporated in the predictor 20. Subsequently, the motion compensation predictor 20 detects a motion vector 123 in the selected reference picture 122, using a search-center-setting unit 32, search-range-setting unit 33 and motion vector search unit 34, and then performs motion compensation based on the motion vector 123 using a motion compensation unit 35, thereby generating the motion compensation prediction signal 109.

Figure 3A:
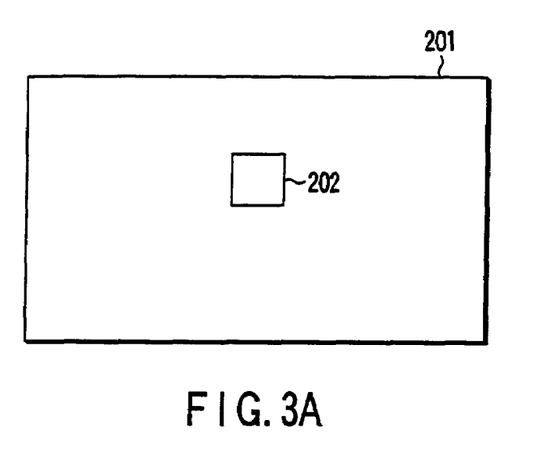
FIGS. 3A to 3D are view useful in explaining a motion vector search performed in the embodiment.
Figure 3B:
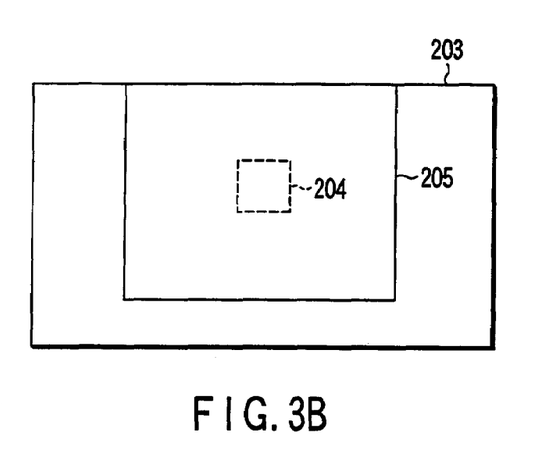
Figure 3C:
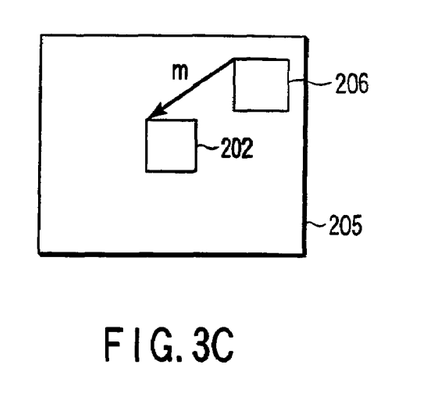
Figure 3D:
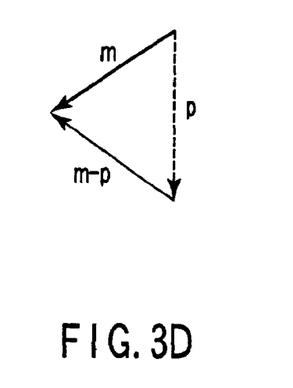

The detection of a motion vector in the embodiment will be described briefly. Assume that a to-be-encoded block in the original picture 201 shown in FIG. 3A and corresponding to one frame of the motion picture signal 101 is a target block 202. A selected reference picture 203 is prepared for the target block 202 as shown in FIG. 3B. A search range 205 having a center-of-search 204 at a position (the position of a zero-point vector) corresponding to, for example, the target block 202 is set in the reference picture 203. After that, as shown in FIG. 3C, a reference block 206 that is most similar to the target block 202 is acquired in the search range 205 by block matching, and a vector m between the target block 202 and reference block 206 is set as a motion vector. Subsequently, as shown in FIG. 3D, a prediction vector p is acquired, using a known technique, from already acquired motion vectors concerning a plurality of target blocks adjacent to the target block 202, thereby setting, as the vector information 108, the differential vector m-p between the motion vector m and prediction vector p, and a reference index r to refer to the reference picture.

Rate Distortion Optimization (RDO) for selecting a coding mode for optimizing the combination of a coding distortion rate and the number of coded bits is known as a method for selecting a coding mode in H.264/AVC. In the embodiment, RDO is utilized for motion vector detection. The motion vector m is, for example, the vector that minimizes cost J given by $$J = SAD(m) + \lambda_M \times R(m,p,r) \quad (1)$$

where $SAD(m)$ represents the sum of the absolute difference between the original picture 201 and reference picture 203, $\lambda_M$ represents a Lagrangian multiplier, $R(m, p, r)$ represents the number of coded bits of a differential vector and the reference index r (side information).

Figure 4:
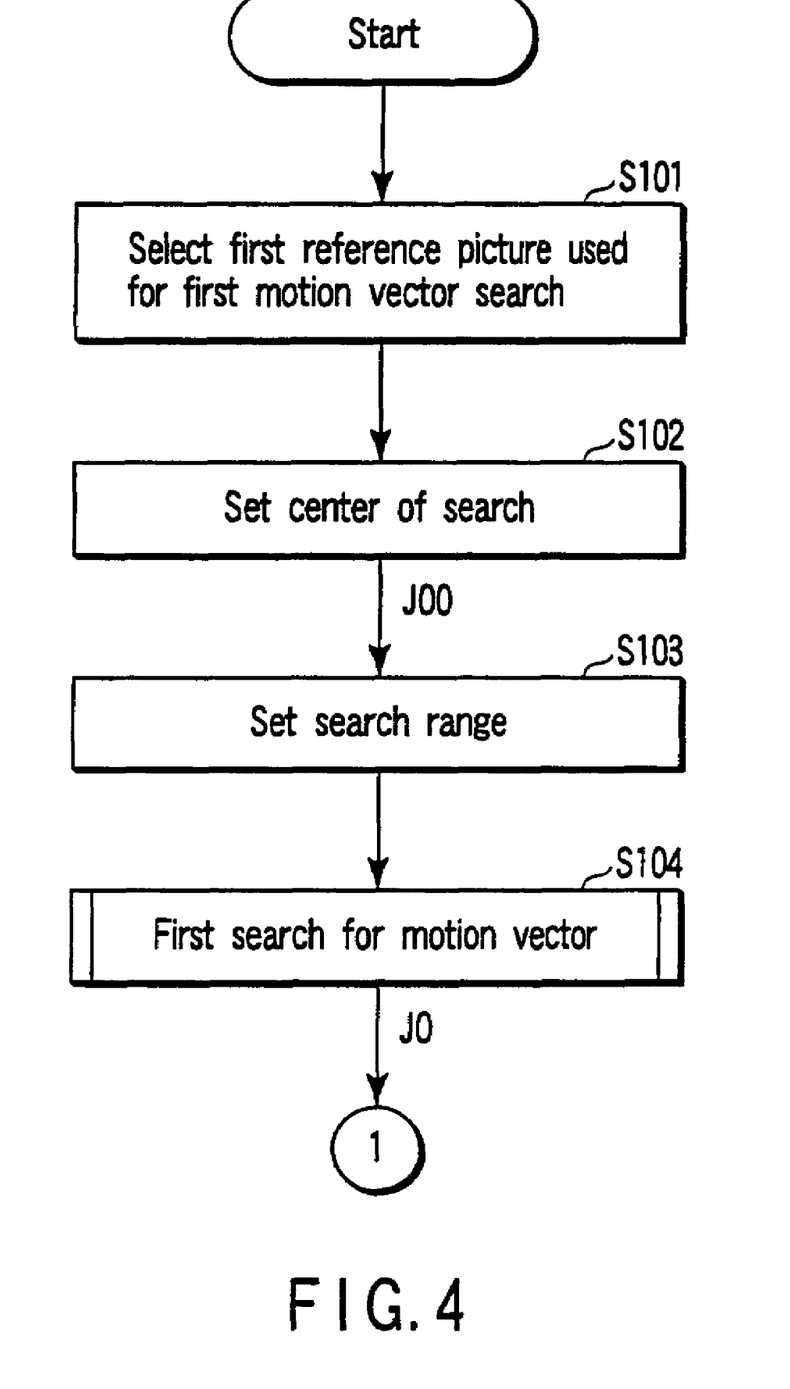
FIG. 4 is a flowchart illustrating an example of the first motion vector search performed in the embodiment.

Referring to the flowcharts shown in FIGS. 4 and 5, a specific procedure for detecting a motion vector will be described.

Firstly, a first reference picture used for a first motion-vector detection is selected (step S101). Various methods can be used to select the first reference picture. For instance, the first reference picture may be selected from a frame closest to the frame of the original picture, or may be selected based on the selection situation of reference pictures used when blocks near the target block are encoded.

Subsequently, the center of search is set on the first reference picture (step S102). The center of search, here, is set at a position corresponding to a block having the minimum cost J and included in the blocks on the first reference picture indicated by the zero-point vector and the prediction vector. At the next step S103, a search range of, for example, a rectangular shape is set around the center of search set at step S102.

A first motion-vector detection is performed by block matching with in the search range set at step S103, thereby acquiring a motion vector MV0 (step S104). At the same time, SAD (=SAD0), the number-of-coded-bits R0 of the side information and cost J0 in the reference block on the first reference picture indicated by the motion vector MV0 are calculated. Cost J0 is acquired by substituting SAD0 and R0 for $SAD(m)$ and $R(m-p)$ in equation (1).

Thereafter, to determine whether J0 is sufficiently low, J0 is compared with a threshold value Th0 (step S105). If J0 is lower than the threshold value Th0, the motion vector detection is finished, and the motion vector detected at step S104 is used for motion compensation. In contrast, if J0 is not less than the threshold value Th0, it is determined whether there is another reference picture (the $i^{th}$ reference picture) used for the $i^{th}$ (i=2, 3, . . . ) motion-vector detection (step S106). If there is no more reference picture, the process is finished, and the motion vector detected at step S104 is used for motion compensation. If the $i^{th}$ reference picture exists, it is selected (step S107). The $i^{th}$ reference picture may be selected from a plurality of reference pictures of frames temporally near the original picture, or from frames referred to when motion-vector detection of blocks near the target block is performed.

After that, the center of search is set on the $i^{th}$ reference picture selected at step S107 (step S108). The center of search, here, is set at a position corresponding to a block, which has a minimum the cost J or a J less than J0, and is included in the blocks on the $i^{th}$ reference picture indicated by (a) the zero-point vector, (b) the prediction vector, and (c) the vector acquired by scaling the motion vector MV0 detected at step S104. More specifically, the vector acquired by scaling is acquired by multiplying the vector MV0 by the ratio of the time interval corresponding to the $i^{th}$ reference picture frame to that corresponding to the first reference picture frame, and is similar to a vector used for a known telescopic search.

Subsequently, the difference between J (=J1) in the block as the center of search set at step S108, and J (=J0) acquired at step S104 is compared with a threshold value Th1 (step S109). If the difference between J1 and J0 is the threshold value Th1 or more, the program proceeds to step S105. If the difference between J1 and J0 is lower than the threshold value Th1, a search range having the center of search set at step S108 is set (step S110). In this case, the search range is set in light of cost J given by equation (1). More specifically, the search range is set so that an optimal motion vector is selected from all motion vector candidates m that satisfy the following algebraic expression (2).

$$R2(m) \leq R0-(SAD1-\Delta ESAD-SAD0)/\lambda_M$$

$$SAD2=SAD1-\Delta ESAD \qquad (2)$$

where R0 and SAD0 represent the number of coded bits of side information and SAD, which correspond to the currently searched motion vector MV0, and R2(m) represents the number of coded bits of the side information. Further, SAD1 represents SAD at the center of search, SAD2 represents SAD corresponding to a motion vector MV2 to be now searched for, $\Delta ESAD$ represents a predicted reduction value of SAD2 with respect to SAD1, and $\lambda_M$ represents a Lagrangian multiplier. For instance, $\Delta ESAD$ is given by the average value of difference between SAD1 and SAD2 for motion-vector detection of previous coded block.

Matching is performed within the search range thus set, thereby performing the $i^{th}$ motion vector search to acquire a motion vector MV2, and to acquire J (=J2) in a reference block indicated by the motion vector MV2 on the $i^{th}$ reference picture (step S111).

Subsequently, it is determined whether J2 is lower than J0 (step S112). If J2 is lower than J0, J2 is set as new J0 (step S113), followed by the program returning to step S105. If, on the other hand, J2 is greater than J0, the program returns to step S105.

Figure 5:
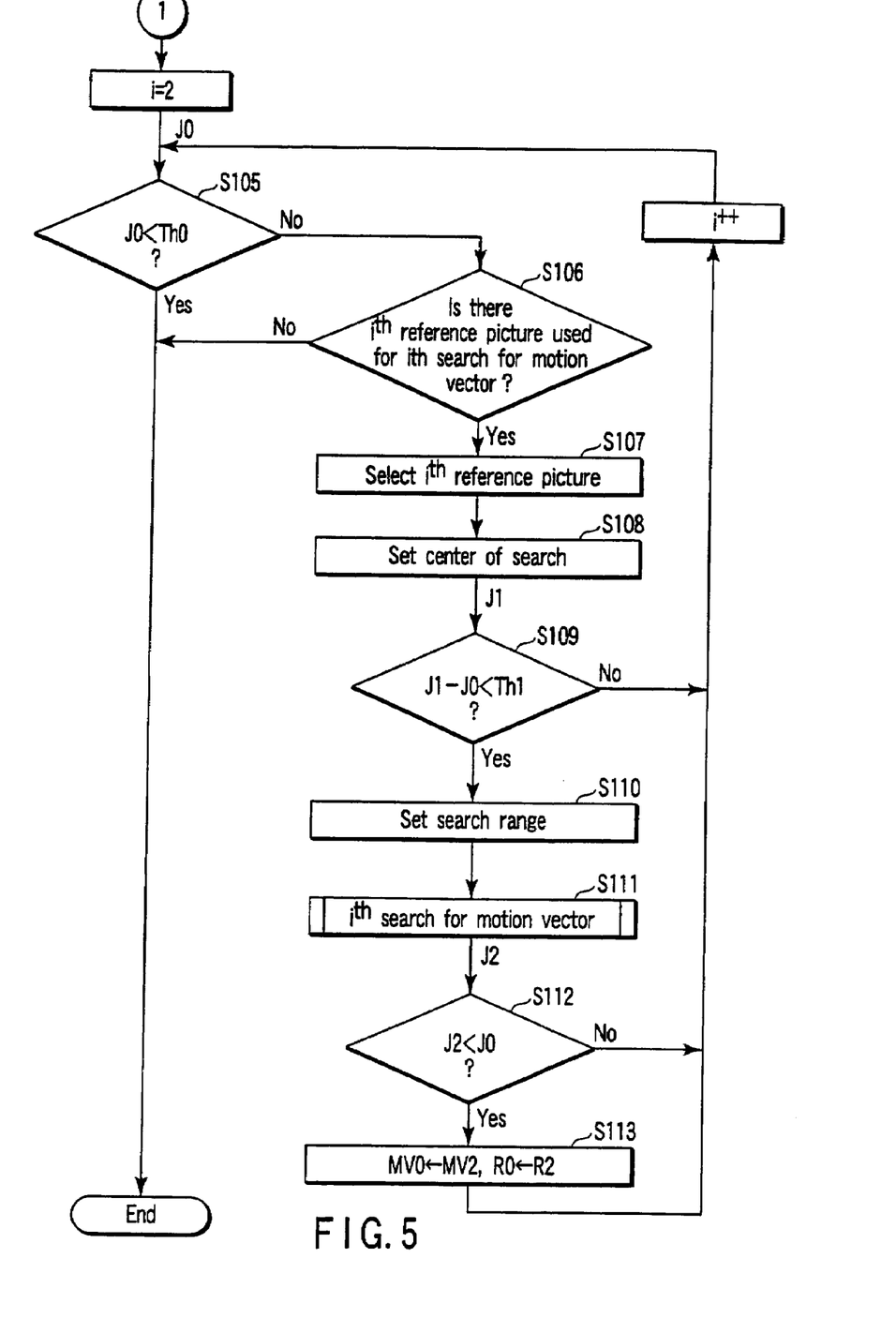
FIG. 5 is a flowchart illustrating the $i^{th}$ (i=2, 3, ...) motion vector search performed in the embodiment.

Thus, in the example of FIG. 5, to narrow down the search range of the motion vector in the second et seq. motion vector searches, the number of times of matching needed for searching for the motion vector is further reduced. Accordingly, the number of calculations needed for motion compensation prediction is reduced.

Figure 6:
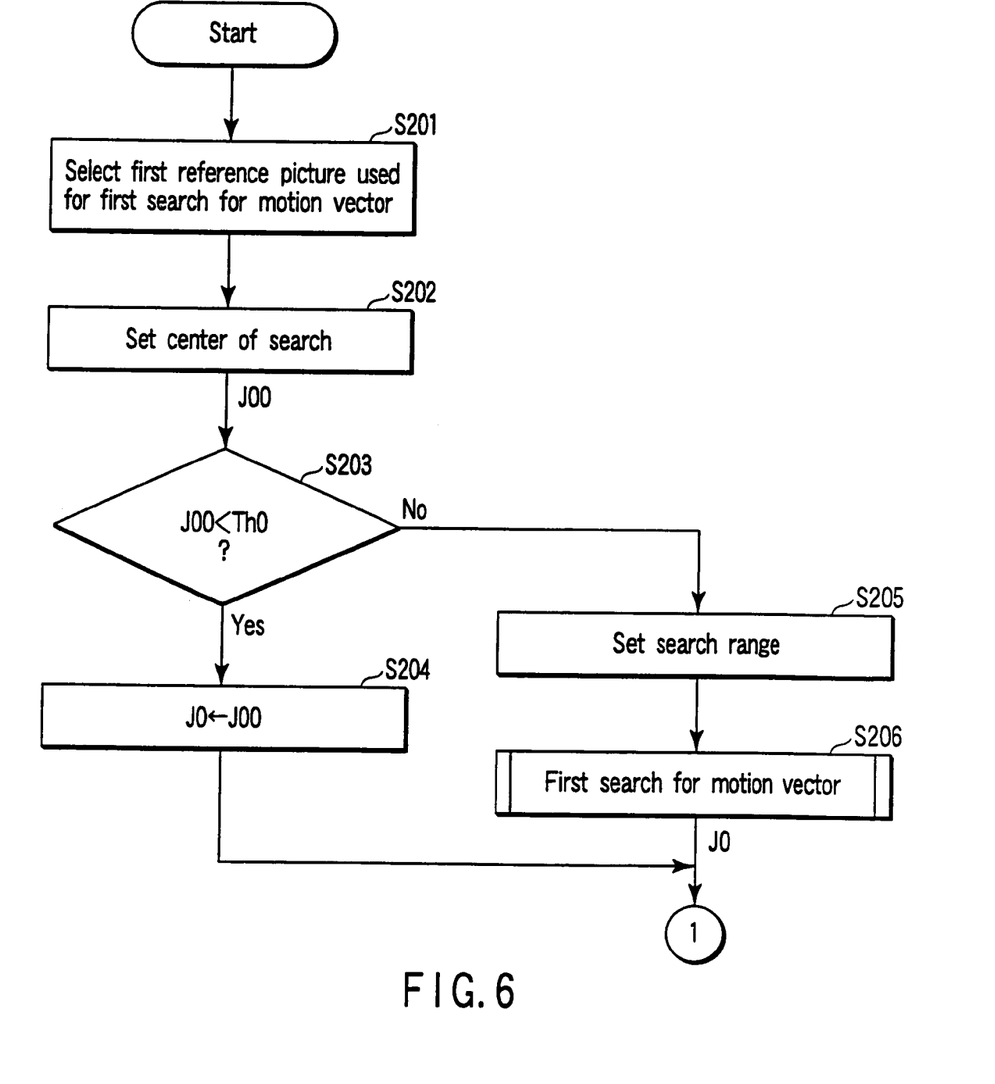
FIG. 6 is a flowchart illustrating another example of the first motion vector search performed in the embodiment.

Referring now to the flowchart of FIG. 6, a description will be given of another example of the first motion vector search. The flowchart of FIG. 6 is acquired by modifying that of FIG. 4. Firstly, a first reference picture used for the first motion vector search is selected from a plurality of frames (step S201). The way of selecting the first reference picture is not limited. For instance, this picture may be selected from frames closest to the frames of a to-be-encoded picture, or may be selected based on the selected state of reference pictures used for encoding blocks adjacent to a target block. After that, the center of search is set on the first reference picture (step S202). In this example, the center of search is set to the position of a block having the minimum SAD (=SAD00) and included in the blocks of the first reference picture indicated by the positions of the zero-point vector and prediction vector. The above process is similar to the process at steps S101 and S102 of FIG. 4.

Subsequently, to check whether J00 is sufficiently low, J00 is compared with the threshold value Th0 (step S203). If J00 is lower than the threshold value Th0, J00 is set as J0, followed by the program proceeding to step S105 of FIG. 5, and performing the $i^{th}$ et seq. motion vector searches. In contrast, if J00 is higher than the threshold value Th0, a search range including the center of search set at step S202 is set on the first reference picture (step S205).

More specifically, at step S205, the search range is set, as at step S110 in FIG. 5, so that an appropriate motion vector is selected from all motion vector candidates m that satisfy the above-recited equation (2). In this case, however, the-number-of-coded-bits (R1) of the side information and SAD (SAD1), which corresponds to the motion vector MV1 to be now searched for, are substituted for R0 and SAD0 in the equation (2). Accordingly, the equation (2) is modified in the following manner:

$$R2(m)<R1-\Delta ESAD/\lambda_M \qquad (3)$$

Thus, in the example of FIG. 6, also in the first motion vector search, the motion vector search range is narrowed down. Therefore, the number of times of block matching necessary for a motion vector search is further reduced, resulting in a further reduction in the number of calculations.

Although the above-described embodiment employs SAD, SAD may be replaced with the sum of absolute transferred differences (SATD), which is acquired by performing Hadamard transform on the differences between a motion picture signal and reference picture signals. For instance, $\Delta ESATD$ is given by the average value of difference between SATD1 and SATD2 for motion-vector detection of previous coded block. In this case, the following equation (4) is used instead of the equation (2):

$$R2(m)<R0-(SATD1-\Delta ESATD-SATD0)/\lambda_M$$

$$SATD2=SATD1-\Delta ESATD \qquad (4)$$

Figure 7:
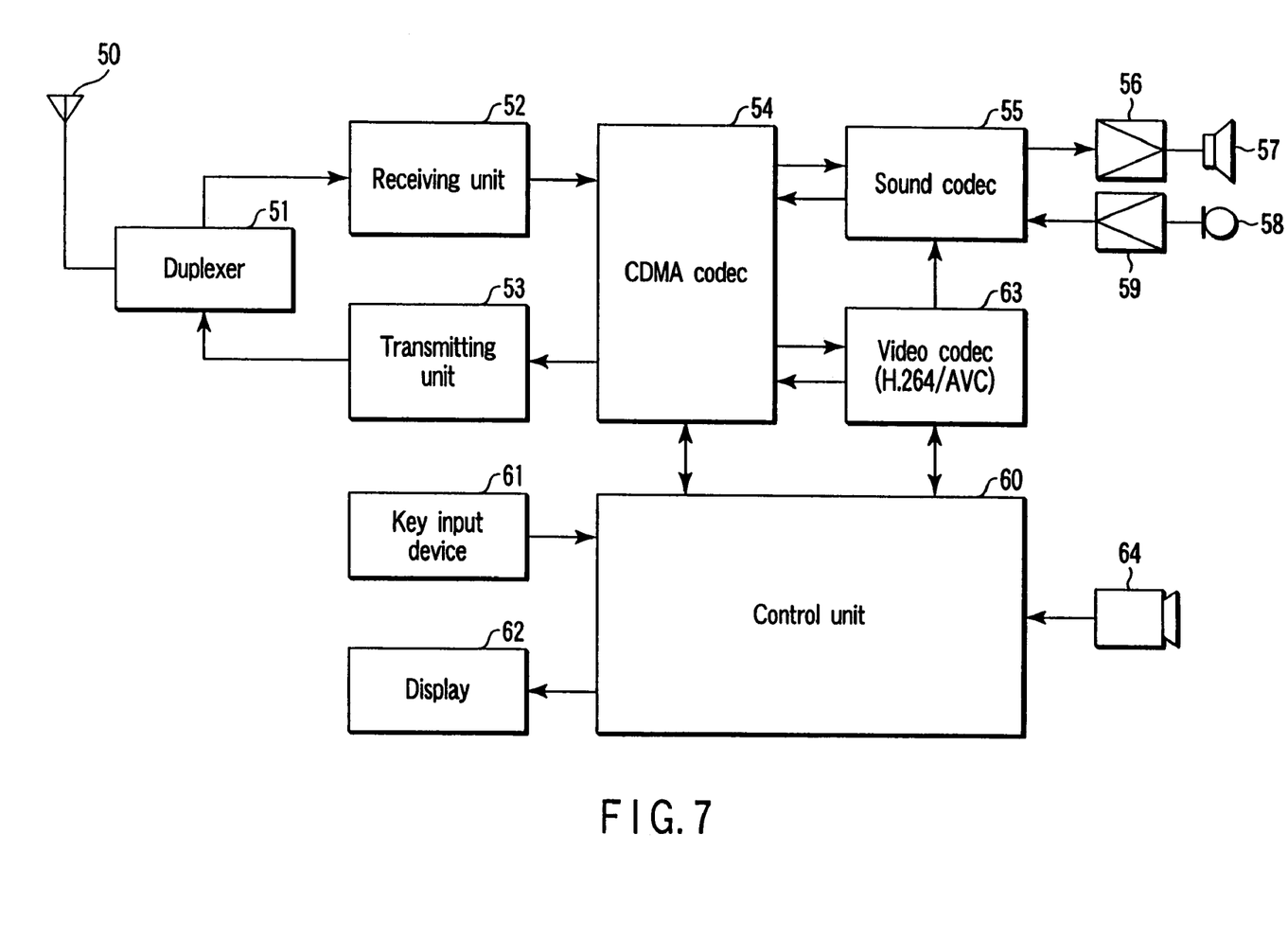
FIG. 7 is a block diagram illustrating a portable radio terminal device example that incorporates the video encoder of FIG. 1.

FIG. 7 shows a portable radio terminal device such as a cellular phone which is an applied example of the present invention. Upon reception, an antenna 50 receives a radio frequency (RF) signal transmitted by a base station included in a carrier communication network (not shown). The received signal is input to a receiving unit 52 via a duplexer 51. The receiving unit 51 performs processing such as amplification, frequency conversion (down conversion), and analog to digital conversion on the received signal to generate an intermediate frequency (IF) signal. A received baseband signal is input to a code division multiple access (CDMA) codec 54. The code division multiple access codec 54 subjects the signal to orthogonal demodulation and despreading to obtain received data. If the received RF signal is a voice signal, a voice codec 55 decompresses the received data in accordance with a predetermined voice decoding system. The voice codec 55 further performs a digital to analog conversion to decode the data into an analog signal. The analog signal is supplied to a speaker 57 via a power amplifier 56. The speaker 57 then outputs a sound.

Upon transmission, a microphone 58 detects a sound made by a user as a sound signal. A preamplifier 59 amplifies the sound signal. Then, the sound codec 55 digitalizes the amplified signal and compresses the digitalized signal in accordance with a predetermined sound coding system to obtain transmitted sound data. The transmitted sound data is input to the CDMA codec 54. The CDMA codec 54 then subjects the data to spreading and orthogonal modulation. A transmitting unit 53 then subjects the orthogonal modulated signal thus obtained to a digital-analog conversion and a frequency conversion (up convert) to convert it into an RF signal. The power amplifier then amplifies the RF signal and supplies the amplified signal to the antenna 50 via the duplexer 51. As a result, the RF signal is radiated to the air as an electric wave and transmitted to the base station.

A control unit 60 consisting of a central processing unit (CPU) controls each unit, performs various mathematical operations, and processes video and text information. The control unit 60 connects not only to the CDMA codec 54 and sound codec 55 but also to a key input unit 61, a display 62, a video codec 63, and a camera (imaging device) 64. Each unit is supplied with power from a battery (not shown) under the control of the control unit 60.

The video codec 63 conforms to H.264/AVC and includes the video encoder shown in FIG. 1 or 2 and a video decoder not shown in the drawings. A video encoder codes a motion picture signal obtained using, for example, the camera 64 to generate a coded bit stream. The coded bit stream is supplied to the CDMA codec 54 under the control of the control unit 60. The coded bit stream is then transmitted to the base station via the transmitting unit 53, duplexer 51, and antenna 50. In this case, by causing the control unit 60 to process the motion picture signal obtained using the camera 64 and to supply the processed signal to the display 62, it is possible to monitor the photographed picture.

If the received data is a compressed motion picture signal, the CDMA codec 54 converts the received data into a coded bit stream. The coded bit stream is input to the video decoder. The video decoder decodes the coded bit stream to generate a motion picture signal. The motion picture signal generated by the video decoder is supplied to the display 62 under the control of the control unit 60. Consequently, the display 62 shows the signal as an picture.

The CPU of the control unit 60 uses software to execute a part of the processing required for the video encoder (for example, determination of a prediction mode) and a part of the processing required for the video decoder. The video encoder according to the embodiments of the present invention drastically reduces the number of calculations necessary for searching for the motion vector as previously described. This in turn reduces loads on the video encoder and control unit 40. As a result, it is possible to contribute to reducing the size and power consumption of a radio terminal device such as the one shown in FIG. 7.

The present invention constructed as above can appropriately set the search range of the motion vector, therefore the number of times of block matching required to search for the motion vector can be minimized. This enables the advantage of an increase in coding efficiency due to the use of a plurality of reference picture frames to be acquired with a small number of calculations.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A video encoder for encoding a motion picture signal, comprising:

means for sequentially selecting one reference picture signal from a plurality of reference picture signals;

means for setting a center of search on a reference picture indicated by each of the reference picture signals sequentially selected;

means for setting, on the reference picture, a search range including the center of search;

means for performing block matching in the search range to search for a motion vector;

means for repeatedly performing, for a target block in the motion picture signal, selection of each of the reference picture signals, setting of the center of search, setting of the search range, and the search for the motion vector, thereby acquiring an optimal motion vector, and for then performing motion compensation on each of the reference picture signals sequentially selected, using the optimal motion vector, to generate a predicted picture signal; and means for encoding a signal indicating a difference between the target block in the motion picture signal and the predicted picture signal, and side information, wherein the means for setting the search range on the reference picture indicated by a last one of the reference picture signals sequentially selected, sets the search range based on information related to the motion vector detected in the search range set on the reference picture indicated by a second last one of the reference picture signals, and wherein the means for setting the search range sets the search range to enable the means for searching for the motion vector to select the motion vector from all vector candidates m that satisfy the following algebraic expression:

$$R2(m) < R0 - (SAD1 - \Delta ESAD - SAD0)/\lambda_M$$

$$SAD2 = SAD1 - \Delta ESAD$$

where R0 and SAD0 represent a number of coded bits of side information and SAD, respectively, and correspond to a currently searched motion vector MV0, R(m) represents the number of coded bits of the side information, SAD1 represents SAD at the center of search, SAD2 represents SAD corresponding to a motion vector MV2 to be now searched for, $\Delta ESAD$ represents a predicted reduction value of SAD2 with respect to SAD1, and $\lambda_M$ represents a Lagrangian multiplier, SAD representing a sum of absolute differences between the motion picture signal and each of the reference picture signals sequentially selected.

2. A video encoder for encoding a motion picture signal, comprising:

means for sequentially selecting one reference picture signal from a plurality of reference picture signals;

means for setting a center of search on a reference picture indicated by each of the reference picture signals sequentially selected;

means for setting, on the reference picture, a search range including the center of search;

means for performing block matching in the search range to search for a motion vector;

means for repeatedly performing, for a target block in the motion picture signal, selection of each of the reference picture signals, setting of the center of search, setting of the search range, and the search for the motion vector, thereby acquiring an optimal motion vector, and for then performing motion compensation on each of the reference picture signals sequentially selected, using the optimal motion vector, to generate a predicted picture signal; and means for encoding a signal indicating a difference between the target block in the motion picture signal and the predicted picture signal, and side information, wherein the means for setting the search range on the reference picture indicated by a last one of the reference picture signals sequentially selected, sets the search range based on information related to the motion vector detected in the search range set on the reference picture indicated by a second last one of the reference picture signals, and wherein the means for setting the search range sets the search range to enable the means for searching for the motion vector to select the motion vector from all vector candidates m that satisfy the following algebraic expression:

$$R2(m)<R0-(SATD1-\Delta ESATD-SATD0)/\lambda_M$$

$$SATD2=SATD1-\Delta ESATD$$

where R0 and SATD0 represent a number of coded bits of side information and SATD, respectively, and correspond to a currently searched motion vector MV0, R2(m) represents the number of coded bits of the side information, SATD1 represents SATD at the center of search, SATD2 represents SATD corresponding to a motion vector MV2 to be now searched for, $\Delta ESATD$ represents a predicted reduction value of SATD2 with respect to SATD1, and $\lambda_M$ represents a Lagrangian multiplier, SATD representing a sum of absolute transformed differences acquired by subjecting, to Hadamard transform, the absolute differences between the motion picture signal and each of the reference picture signals sequentially selected.

3. The video encoder according to claim 1, wherein the means for setting the search range sets the search range to enable the means for searching for the motion vector to select the motion vector from all vector candidates m that satisfy the following algebraic expression, when the means performs first selection:

$$R2(m)<R1-\Delta ESAD)/\lambda_M$$

where R1 represents the number of coded bits of the side information, which corresponds to a motion vector to be now searched for.

4. The video encoder according to claim 2, wherein the means for setting the search range sets the search range to enable the means for searching for the motion vector to select the motion vector from all vector candidates m that satisfy the following algebraic expression, when the means performs first selection:

$$R2(m)<R1-\Delta ESATD)/\lambda_M$$

where R1 represents the number of coded bits of the side information, which corresponds to a motion vector to be now searched for.

5. The video encoder according to claim 1, wherein the means for setting the center of search sets the center of search at a position of a block having a cost J given by the following equation, when the means performs first setting, the block being included in blocks indicated by a zero-point vector and a prediction vector:

$$J=SAD(m)+\lambda_M \times R(m)$$

where SAD(m) represents the sum of the absolute difference between the motion picture signal and each of the reference picture signals sequentially selected, $\lambda_M$ represents a Lagrangian multiplier, R(m) represents the number of coded bits of a side information.

6. The video encoder according to claim 1, wherein the means for setting the center of search sets the center of search at a position of a block having a minimum cost J given by the following equation, or a cost lower than the cost J acquired at first setting, when the means for setting the center of search performs the $i^{th}$ (i=2, 3, ...) setting, the block being included in blocks indicated by (a) a zero-point vector, (b) a prediction vector and (c) a vector acquired by scaling a motion vector obtained at a first search:

$$J=SAD(m)+\lambda_M \times R(m)$$

where SAD(m) represents the sum of the absolute difference between the motion picture signal and each of the reference picture signals sequentially selected, $\lambda_M$ represents a Lagrangian multiplier, R(m) represents the number of coded bits of a side information.

7. A portable radio terminal device comprising:
the video encoder according to claim 1, and
transmission means for transmitting a coded bit stream acquired by encoding the motion picture signal using the video encoder.

8. A portable radio terminal device comprising:
the video encoder according to claim 2, and
transmission means for transmitting a coded bit stream acquired by encoding the motion picture signal using the video encoder.

* * * * *